(12) United States Patent
Jacobowitz et al.

(10) Patent No.: US 6,674,936 B2
(45) Date of Patent: Jan. 6, 2004

(54) POLARIZATION MODE DISPERSION COMPENSATION USING A WAVELENGTH LOCKED LOOP

(75) Inventors: Lawrence Jacobowitz, Wappingers Falls, NY (US); Casimer Maurice DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 09/944,336

(22) Filed: Aug. 31, 2001

(65) Prior Publication Data

US 2003/0044108 A1 Mar. 6, 2003

(51) Int. Cl.[7] .................................................. G02B 6/28
(52) U.S. Cl. ...................................................... 385/24
(58) Field of Search ................................ 385/24, 12, 3, 385/37, 40; 359/123, 184, 185, 124, 181, 110, 127, 161, 173, 195, 333, 334

(56) References Cited

U.S. PATENT DOCUMENTS

| | | | | |
|---|---|---|---|---|
| 6,175,320 B1 | * | 1/2001 | Heflinger | 341/137 |
| 6,304,586 B1 | * | 10/2001 | Pease et al. | 372/38.02 |
| 6,341,021 B1 | * | 1/2002 | Wilner et al. | 398/79 |
| 6,377,719 B1 | * | 4/2002 | Damask | 385/11 |
| 6,469,817 B1 | * | 10/2002 | Heflinger | 398/202 |
| 2002/0176457 A1 | * | 11/2002 | DeCusatis et al. | 372/26 |

OTHER PUBLICATIONS

"Introduction to DWDM Technology Data in a Rainbow", by Stamatios V. Kartalopoulos, Lucent Technologies, IEEE Communcations Society, Sponsor, SPIE Optical Engineering Press, pp. 65–68.

"Introduction to DWDM Technology Data in a Rainbow", by Stamatios V. Kartalopoulos, Chapter 9, pp. 131–136.

"Distributed feedback semiconductor lasers", by John Carroll, et al., IEE Circuits, Devices and Systems Series 10, SPIE Press Monograph vol. PM52, 1998, pp. 7–15.

"Micromachining system accommodates large wafers", by Robert Bann, et al., Laser Focus World—The 2001 Annual Survey of the Laser Marketplace, Jan. 2001, pp. 189–192.

* cited by examiner

Primary Examiner—Jean F. Duverne
(74) Attorney, Agent, or Firm—Scully, Scott, Murphy & Presser; Tiffany L. Townsend, Esq.

(57) ABSTRACT

A system and method of compensating for optical polarization dispersion effects exhibited in a length of optical fiber in an optical network. The system and method exploits a wavelength-locked loop servo-control circuit and methodology that detects a polarization mode dispersion characteristic of the optical signal and enables real time adjustment of the center wavelength of the optical in manner so as to minimize polarization effects in the optical fiber link. In another embodiment, the wavelength-locked loop servo-control circuit and methodology is implemented for enabling real time physical adjustment, e.g., X-Y dimension strain control, of the optical fiber link itself in accordance with the detected amount of polarization mode dispersion.

30 Claims, 7 Drawing Sheets

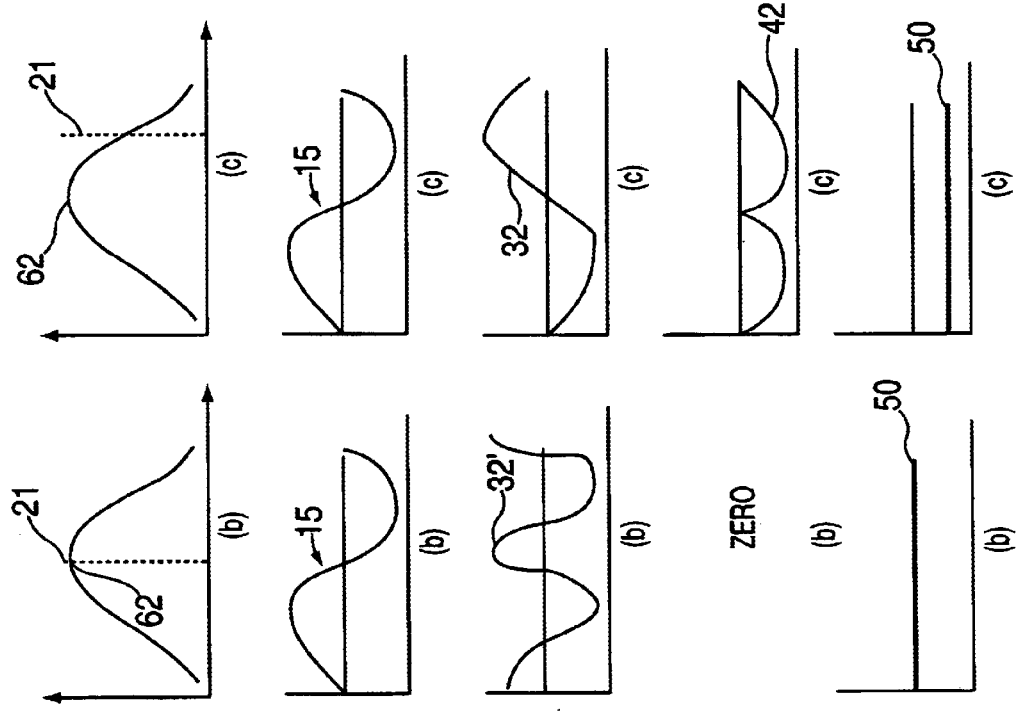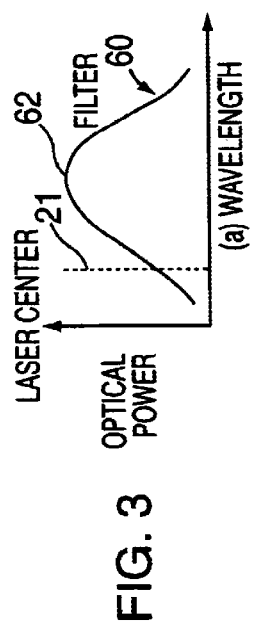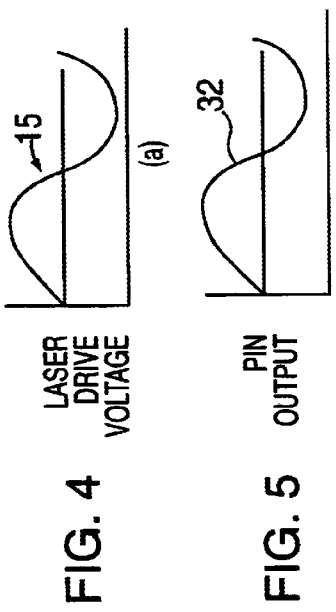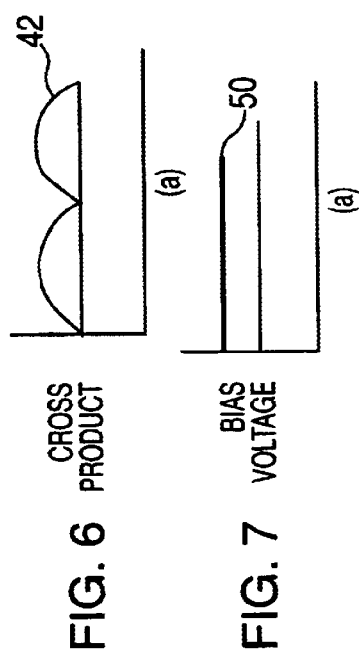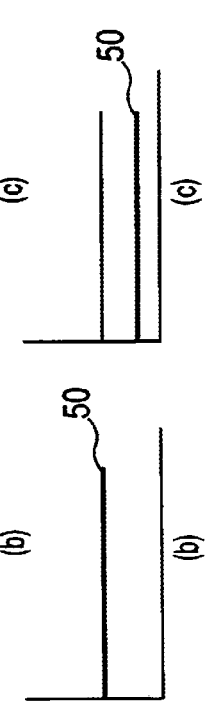

POLARIZATION MODE DISPERSION COMPENSATION USING A WAVELENGTH LOCKED LOOP

BACKGROUND OF THE INVENTION

1. Field of the Invention

The present invention relates generally to optical devices such as lasers, and fiber optic data transmission systems employing the same. Particularly, the present invention is directed to a novel wavelength-locked loop servo-control circuit for optimizing performance of fiber optic transmission systems, particularly, by realizing efficient Polarization Mode Dispersion compensation over singlemode fiber in high-speed fiber optic data transmission systems.

2. Description of the Prior Art

Wavelength Division Multiplexing (WDM) and Dense Wavelength Division Multiplexing (DWDM) are light-wave application technologies that enable multiple wavelengths (colors of light) to be paralleled into the same optical fiber with each wavelength potentially assigned its own data diagnostics. Currently, WDM and DWDM products combine many different data links over a single pair of optical fibers by re-modulating the data onto a set of lasers, which are tuned to a very specific wavelength (within 0.8 mm tolerance, following industry standards). On current products, up to 32 wavelengths of light can be combined over a single fiber link with more wavelengths contemplated for future applications. The wavelengths are combined by passing light through a series of thin film interference filters, which consist of multi-layer coatings on a glass substrate, pigtailed with optical fibers. The filters combine multiple wavelengths into a single fiber path, and also separate them again at the far end of the multiplexed link. Filters may also be used at intermediate points to add or drop wavelength channels from the optical network.

In recent years, the efforts to develop very high data rate (10–40 Gbit/s) singlemode fiber optic transmission systems have had to deal with the fundamental limit imposed by Polarization Mode Dispersion ("PMD"). Like other types of pulse dispersion, PMD causes optical pulses to spread as they propagate through fibers, eventually causing intersymbol interference and bit errors. Effective compensation techniques have been proposed for other types of dispersion, such as modal and chromatic, leaving PMD as the fundamental limitation on the maximum data rate in a fiber optic communication system. Particularly, as illustrated in FIG. 1(a)–1(c), PMD arises because singlemode fibers transmit light in two modes, polarized horizontally 62 and vertically 63. As shown in FIG. 1(a), when the optical signal is launched, these polarization modes 62, 63 are initially in phase. The two modes mix freely in a circularly symmetric fiber, and even in a rectangular optical waveguide some degree of mode mixing will occur. In an ideal, homogeneous fiber, the two polarization states would not interact (FIG. 1(a)). If the interaction is very small (the two modes are degenerate) then there is little effect from the different polarizations. However, in all real fibers there are inhomogeneities, imperfections, micro and macrobends, and other environmental influences that affect the two polarization states differently. Variations in the fiber drawing process may also result in birefringence, sometimes equivalent to as much as a one wavelength shift between the two orthogonal polarization states of a signal at fiber optic wavelengths near 1550 nm, after transmission through only 10 meters of fiber. This results in a low level of birefringence (the two polarization states experience different effective indices of refraction). The birefringence can vary randomly along the length of the fiber, and interference between the two polarization states when they are not treated equally leads to PMD. For example, FIG. 11(b) illustrates how imperfections causing differences in the refractive indices of the two polarization modes, causes the speed of the two modes to vary through the fiber length, causing a delay 65. That is, for example, one polarization mode 63 lags behind the other mode 62. The signal dispersion caused by the difference in the arrival times of the two modes can limit system performance. Another phenomenon is mixing of the polarization modes which causes pulses to spread out in both polarizations such as shown in FIG. 1(c).

There is a related effect, polarization mode loss (PML), which describes the pulse spreading of PMD in terms of an effective optical power penalty on the fiber optic link budget. Polarization dependent loss can also arise when one polarization state is attenuated more than the other; this is essentially noise caused by the unintentional modulation of the light's polarization. As data rates exceed 2.5 Gbit/s and approach 10 Gbit/s to 40 Gbit/s ranges, the pulse spreading caused by PMD can accumulate to levels that represent a significant fraction of the interval between bits. As shown in FIG. 1(c), because of the random nature of bending strain and environmental effects in an optical fiber, PMD accumulation causes the data pulses to spread out proportionally to the square root of fiber length (as opposed to chromatic dispersion, which is linearly proportional to fiber length). This statistical phenomena is called differential group delay. Each fiber has a characteristic PMD dispersion parameter, typically on the order of 0.05 to 1 picoseconds/$\sqrt{km}$ (hereinafter ps/$\sqrt{km}$). It is understood that, PMD varies with time, optical wavelength, and operating conditions. Thus, for example, PMD may be much larger for outdoor cables suspended from telephone poles and subject to wind forces. PMD was typically not measured or specified for fibers installed more than a few years ago; due to more relaxed manufacturing controls at the time, such fibers are likely to have much higher levels of PMD. The PMD specifications noted above are average values; instantaneous PMD from a sudden change in cable properties can be much higher. In principle, all optical components exhibit some level of PMD, although fiber is the most important source because light travels furthest through fiber.

PMD impacts both analog and digital communication systems and, in the digital case, the end to end differential group delay caused by PMD should be no more than one-tenth the bit interval. As an example, a 10 Gbit/s system would require end to end PMD of no more than 10 ps. Thus, the fiber cable would have to meet specifications of less than 1 ps/$\sqrt{km}$; for a 100 km link or less than 0.1 ps/$\sqrt{km}$ for a 10,000 km link. For a 40 Gbit/s system the total PMD is limited to 2.5 ps; a 10,000 km link would require a PMD of less than 0.025 ps/$\sqrt{km}$, which is lower than the best values currently available. Thus, current 40 Gbit/s transceiver designs are limited in their applications to installed legacy fiber. Optical amplifiers for long haul systems pass through accumulated PMD.

It is increasingly apparent that some form of PMD compensation is required in order to prevent these effects from limiting the distance and data rate of fiber optic links. However, it is the case that effective PMD compensation does not yet exist.

It would thus be highly desirable to provide an apparatus and method for realizing efficient PMD compensation over singlemode fiber in high-speed fiber optic data transmission systems.

It would thus be highly desirable to provide a system and method for automatically optimizing a fiber optic system by reducing the undesirable signal transmission effects caused by PMD, and particularly a system and method for overcoming the pulse spreading associated with PMD phenomena.

SUMMARY OF THE INVENTION

It is therefore an object of the present invention to provide an apparatus and method for realizing efficient PMD compensation over singlemode fiber in high-speed fiber optic data transmission systems.

It is another object of the present invention to provide a system and method for automatically optimizing a fiber optic system by reducing the undesirable effects caused by PMD, and particularly a system and method for overcoming the pulse spreading associated with PMD phenomena.

It is still another object of the present invention to provide a servo-control mechanism for automatically optimizing signal transmission in a fiber optic system which may be used in conjunction with standard PMD detector devices.

It is a therefore an object of the present invention to provide a servo-control loop for implementation with a PMD detector mechanism in a fiber optic transmission system that enables real-time compensation of input signal characteristics in order to provide optimum signal transmission with reduced PMD effects. It is a further object of the present invention to provide a servo-control loop for implementation with a PMD detector mechanism in a fiber optic transmission system that provides real-time PMD compensation by controlling input signal characteristics.

It is yet a further object of the present invention to provide a servo-control loop for implementation with a PMD detector mechanism in a fiber optic transmission system that provides real-time PMD compensation by controlling strain of the optical fiber.

Thus, according to the principles of the invention, there is provided a dispersion compensation system for an optical system comprising: an optical signal generator for providing an optical signal capable of being transmitted via a fiber optic link in an optical network, the optical signal characterized as having an operating center wavelength and the fiber optic length exhibiting means for causing polarization mode dispersion of the optical signal; a detector device for detecting an amount of polarization mode dispersion characteristic of the optical signal transmitted in the fiber link and generating an electric signal representing the detected amount; and, wavelength-locked loop servo-control circuit for automatically adjusting a peaked center wavelength of the optical signal in accordance with the detected amount of polarization mode dispersion to thereby minimize the polarization mode dispersion of the optical signal in the optical fiber link, the adjusted optical signal capable of being optimally transmitted over longer fiber distances with reduced dispersion effects in the optical network.

In a second embodiment, the wavelength-locked loop servo-control circuit is implemented for physically adjusting the optical fiber, e.g., by providing X-Y dimension strain control of the fiber, in accordance with a detected amount of polarization mode dispersion detected to thereby minimize the polarization mode dispersion of the optical signal in the optical fiber link.

BRIEF DESCRIPTION OF THE DRAWINGS

Further features, aspects and advantages of the apparatus and methods of the present invention will become better understood with regard to the following description, appended claims, and the accompanying drawings where:

FIGS. 3(a)–3(c) are signal waveform diagrams depicting the relationship between laser optical power as a function of wavelength for three instances of optic laser signals;

FIGS. 4(a)–4(c) are signal waveform diagrams depicting the laser diode drive voltage dither modulation (a sinusoid) for each of the three waveform diagrams of FIGS. 3(a)–3(c);

FIGS. 5(a)–5(c) are signal waveform diagrams depicting the resulting feedback error signal output of the PIN diode for each of the three waveform diagrams of FIGS. 3(a)–3(c);

FIGS. 6(a)–6(c) are signal waveform diagrams depicting the cross product signal resulting from the mixing of the amplified feedback error with the original dither sinusoid;

FIGS. 7(a)–7(c) are signal waveform diagrams depicting the rectified output laser bias voltage signals which are fed back to adjust the laser current and center frequency;

DETAILED DESCRIPTION OF PREFERRED EMBODIMENTS

The present invention is directed to a fiber optic transmission system implementing a novel servo-control loop for providing a stable, optical output signal with reduced PMD effects and which enables increased system bandwidths than currently achievable in state of the art fiber optic transmission systems. According to the invention as will be described herein with respect to FIGS. 8 and 9, PMD compensation may be accomplished by any one of two methods: 1) controlling the wavelength of the signal applied to the system (wavelength control); and, 2) controlling the strain of the length of fiber optic cable itself used in the system (strain control).

Figure 1A:
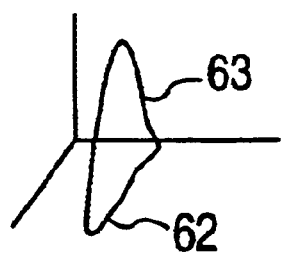
FIG. 1 is a block diagram illustrating the basic principles of polarization mode dispersion phenomena of optical signals.
Figure 1B:
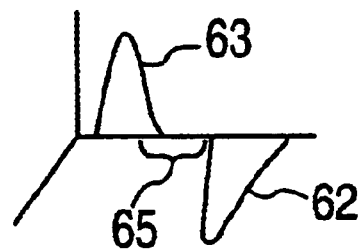
Figure 1C:
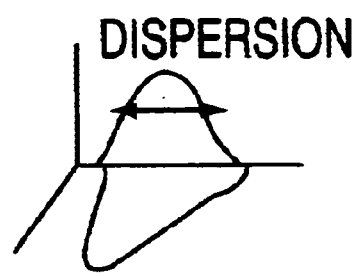
Figure 2A:
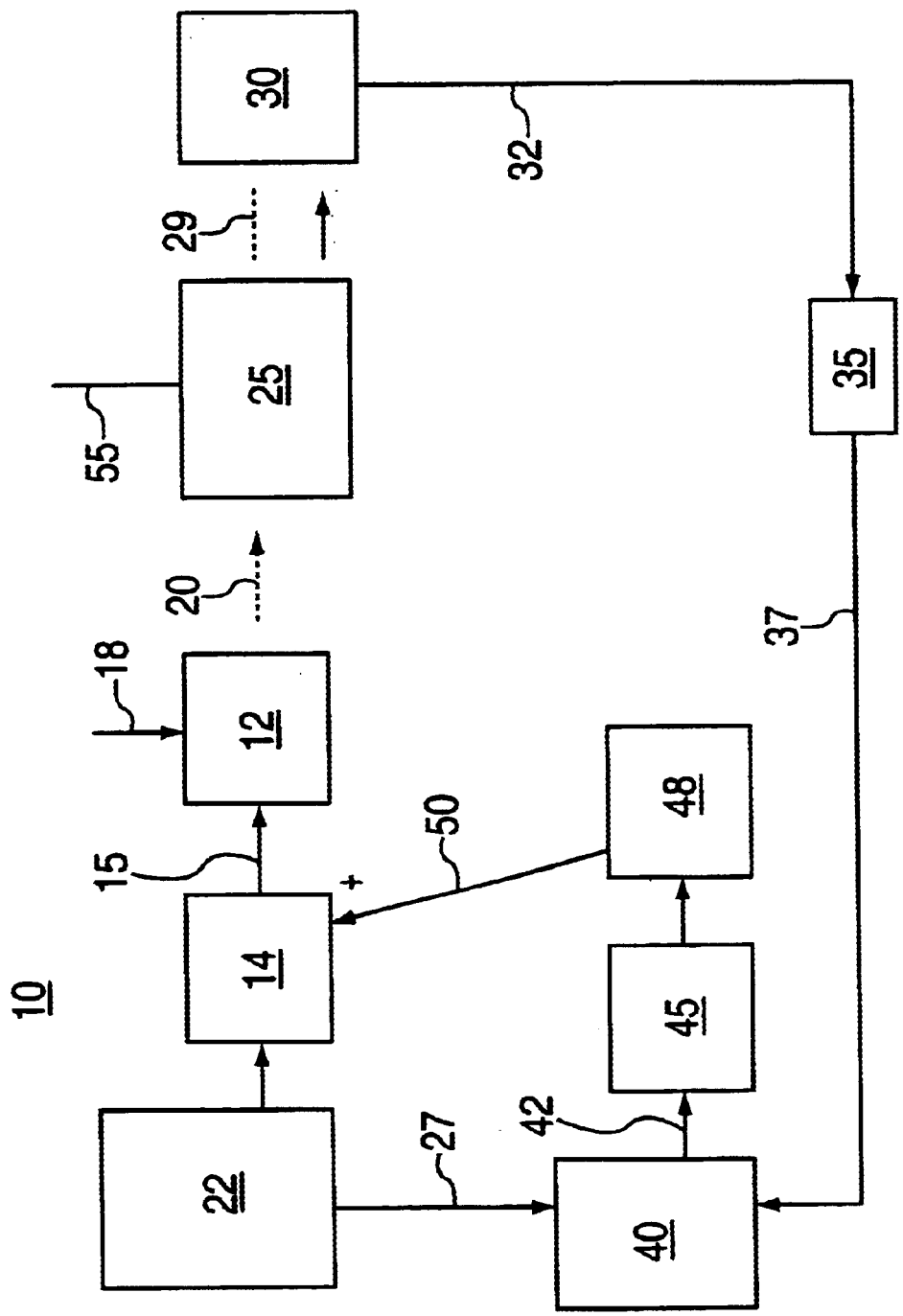
FIGS. 2(a) and 2(b) depict example underlying wavelength-locked loop system architectures.

The explanations herein discuss both wavelength and frequency, which have a reciprocal relationship ($\lambda = c/f$, where c=speed of light), as is well known in the field of optics. With regard to the dispersion compensation system of the invention, FIG. 2(a) illustrates the novel servo-control system implementing a principle referred to herein as the "wavelength-locked loop" or "lambda-locked loop" (since the symbol lambda is commonly used to denote wavelength). The basic operating principle of the wavelength-locked loop (WLL) is described in greater detail in commonly-owned, co-pending U.S. patent application Ser. No. 09/865,256, entitled APPARATUS AND METHOD FOR WAVELENGTH-LOCKED LOOPS FOR SYSTEMS AND APPLICATIONS EMPLOYING ELECTROMAGNETIC SIGNALS, the whole contents and disclosure of which is incorporated by reference as if fully set forth herein. Particularly, as described in commonly-owned, co-pending U.S. patent application Ser. No. 09/865,256, and with reference to FIG. 2(a), the wavelength-locked loop principle implements a dither modulation to continuously adjust an electromagnetic signal source characterized as having a peaked frequency spectrum or peaked center wavelength, e.g., a laser light source, so as to track the center of a frequency selective device, e.g. a filter passband. In this manner, optimal power of the signal is transmitted and optimal use is made of the system transmission bandwidth. The principle may be exploited for tuning any light source having a peaked frequency spectrum, and additionally, may be used to tune or adjust transmission properties of frequency selective devices such as tunable filters.

For purposes of description, the basic operating principle of the WLL is shown in FIG. 2(a) which depicts an example optic system 10 including a light source such as laser diode 12 driven with both a bias voltage 15 from a voltage bias circuit 14, and modulated data 18 from a data source (not shown). The laser diode generates an optical (laser light) signal 20 that is received by a bandpass filter 25 or, any frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or, may comprise a Distributed Feedback semiconductor laser diode (DFB) such as commonly used for wavelength multiplexing. Preferably, the laser diode emits light in the range of 850 nm to 1550 nm wavelength range. As mentioned, the bandpass filter may comprise a thin film interference filter comprising multiple layers of alternating refractive indices on a transparent substrate, e.g., glass. As further shown in FIG. 2(a), according to the invention, there is an added sinusoidal dither modulation circuit or oscillator 22 for generating a sinusoidal dither modulation signal 27 that modulates the laser bias voltage. The sinusoidal dither signal may be electronically produced, e.g., by varying the current for a laser, or mechanically, by varying the micro-electromechanical system's (MEMS) mirror to vary the wavelength. The dither modulation frequency is on the order of a few kilohertz (kHz) but may range to the Megahertz range. Preferably, the dither modulation frequency is much less than the data rate which is typically on the order of 1–10 GHz. Modulation of the laser diode bias current 15 in this manner causes a corresponding dither in the laser center wavelength. Modulated data is then imposed on the laser, and the optical output passes through the bandpass filter 25. Preferably, the filter 25 is designed to tap off a small amount of light 29, for example, which is incident upon a photo detector receiver device, e.g., P-I-N diode 30, and converted into an electrical feedback signal 32. The amount of light that may be tapped off may range anywhere between one percent (1%) to five percent (5%) of the optical output signal, for example, however, skilled artisans will appreciate any amount of laser light above the noise level that retains the integrity of the output signal including the dither modulation characteristic, may be tapped off. The remaining laser light passes on through the filter 25 to the optical network (not shown). As the PIN diode output 32 is a relatively weak electric signal, the resultant feedback signal is amplified by amplifier device 35 to boost the signal strength. The amplified electric feedback signal 37 is input to a multiplier device 40 where it is combined with the original dither modulation signal 35. The cross product signal 42 that results from the multiplication of the amplified PIN diode output (feedback signal) 37 and the dither signal 35 includes terms at the sum and difference of the dither frequencies. The result is thus input to a low pass filter device 45 where it is low pass filtered and then averaged by integrator circuit 48 to produce an error signal 50 which is positive or negative depending on whether the laser center wavelength is respectively less than or greater than the center point of the bandpass filter. The error signal 50 is input to the laser bias voltage device 15 where it may be added (e.g., by an adder device, not shown) in order to correct the laser bias current 15 in the appropriate direction. In this manner, the bias current (and laser wavelength) will increase or decrease until it exactly matches the center of the filter passband. Alternately, the error signal 50 may be first converted to a digital form, prior to input to the bias voltage device.

Figure 2B:
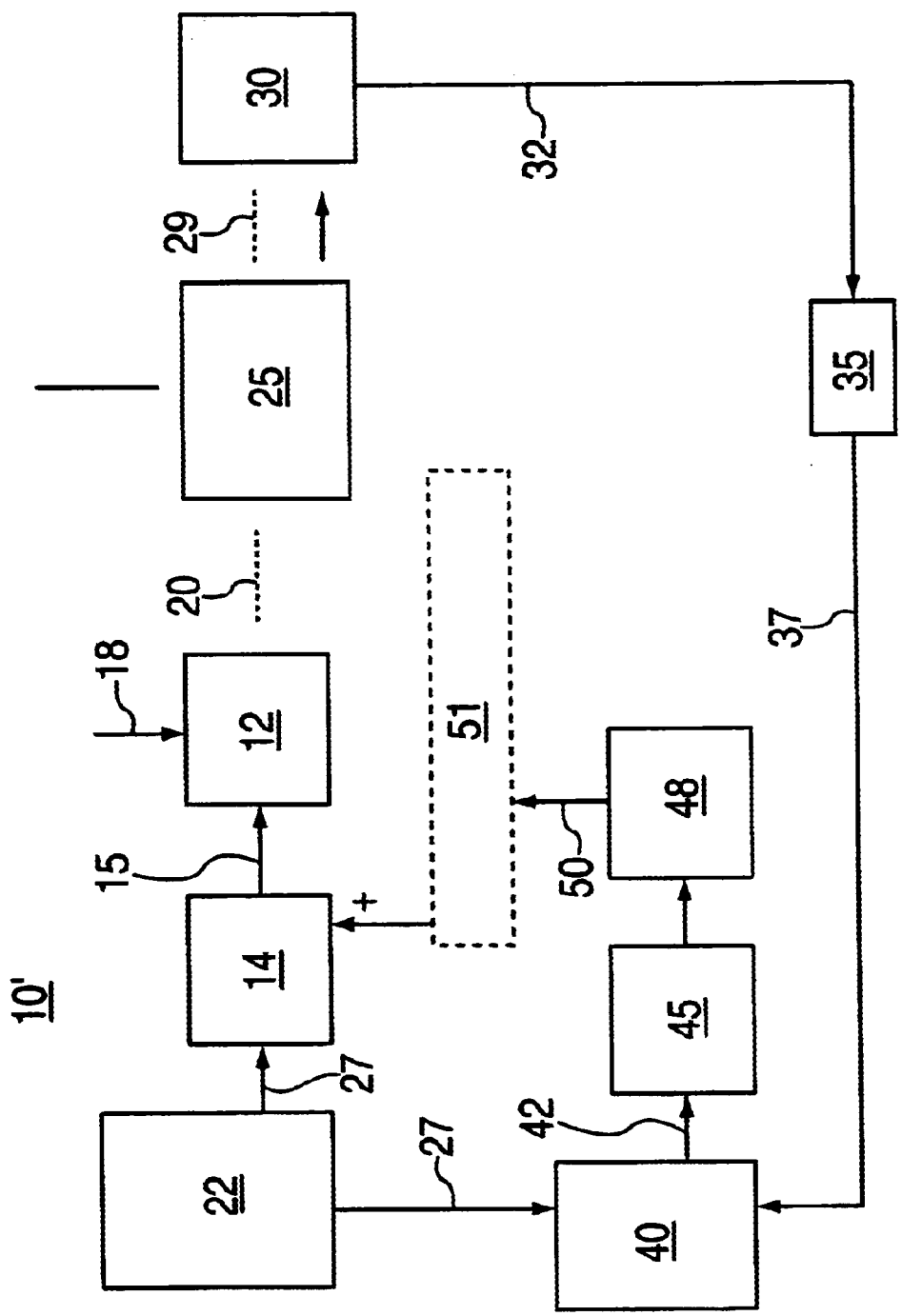

According to one aspect of the invention, the WLL will automatically maintain tracking of the laser center wavelength to the peak of the optical filter. However, in some cases, it may not be desirable to enable laser alignment to the filter peak, e.g., in an optical attenuator. Thus, as shown in FIG. 2(b) which is a system 10' corresponding to the system 10 of FIG. 2(a), there is provided an optional external tuning circuit, herein referred to as a wavelength shifter device 51, that receives the error signal and varies or offsets it so that the laser center wavelength may be shifted or offset in a predetermined manner according to a particular network application. That is, the wavelength shifter 51 allows some external input, e.g., a manual control element such as a knob, to introduce an arbitrary, fixed offset between the laser center wavelength and the filter peak.

Figure 2C:
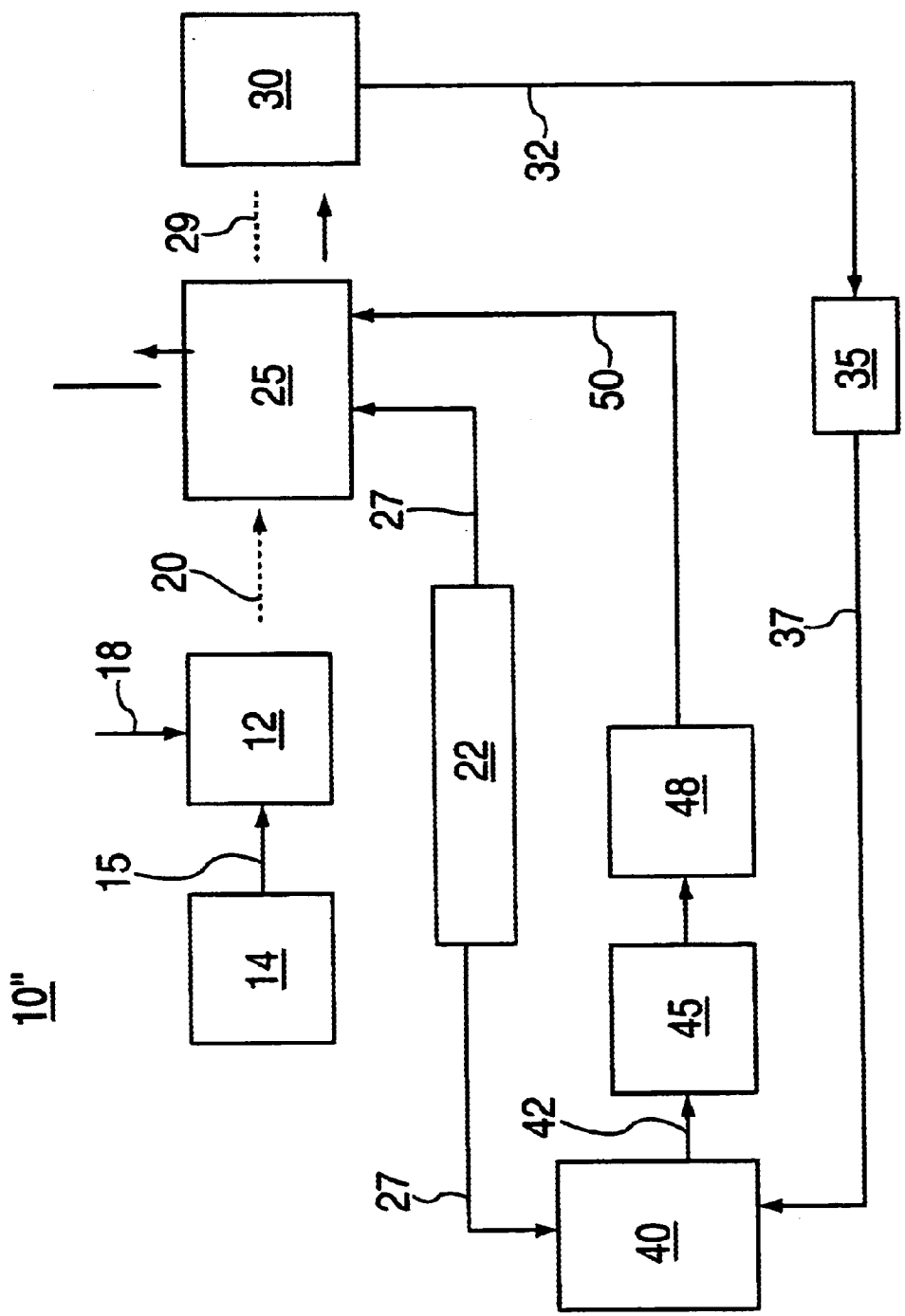
FIG. 2(c) is a general block diagram depicting the underlying system architecture for tuning tunable frequency selective devices such as a bandpass filter according to the principles of the present invention.

It should be understood that, as described in commonly-owned, co-pending U.S. patent application Ser. No. 09/865,256, the WLL servo-control system may be implemented for tuning tunable frequency selective devices such as a bandpass filter for a variety of optical network applications. Thus, in the embodiment depicted in FIG. 2(c), the system 10" comprises similar elements as system 10 (of FIG. 2(a)) including a bias voltage generator device 14 for applying a bias signal 15 to the laser diode 12 for generating an optical signal 20 having a peaked spectrum function. This signal 20 is input to a tunable frequency selective device 25, e.g., a tunable bandpass filter. As shown in FIG. 2(c), however, the sinusoidal dither/driver device 22 is implemented for modulating the peak center frequency of filter pass band with a small dither signal 27. A small amount of light 29 is tapped off the output of the filter 25 for input to the photodetector device, e.g., PIN diode 30, where the optical signal is converted to electrical signal 32, amplified by amplifier device 35, and input to the mixer device 40 which additionally receives the dither signal 27. The mixer device generates the vector cross product 42 of the amplified feedback signal 37 with the dither signal 27 and that result is low-pass filtered, and smoothed (e.g., integrated) by integrator device 48 to provide error signal 50, in the manner as will be discussed herein with reference to FIGS. 3–7. This error signal 50 may be a bi-polar signal and may be used to dynamically adjust the peak center frequency of the filter passband until it matches the center frequency of the laser signal input 20.

The operating principle of the WLL is further illustrated in the timing and signal diagrams of FIGS. 3–7. FIGS. 3(a)–3(c) particularly depicts the relationship between laser optical power as a function of wavelength for three instances of optic laser signals: a first instance (FIG. 3(a)) where the laser signal frequency center point 21 is less than the bandpass function centerpoint as indicated by the filter bandpass function 60 having centerpoint 62 as shown superimposed in the figures; a second instance (FIG. 3(b)) where the laser frequency center point 21 is aligned with the bandpass function centerpoint 62; and, a third instance (FIG. 3(c)) where the laser frequency center point 21 is greater than the bandpass function centerpoint 62. In each instance, as depicted in corresponding FIGS. 4(a)–4(c), the laser diode drive voltage signal 15 is shown dithered (a sinusoid) resulting in the laser wavelength dithering in the same manner. The dithered laser diode spectra passes through the filter, and is converted to electrical form by the PIN diode 30. In each instance of the laser signals depicted in FIGS. 3(a) and 3(c) having frequency centerpoints respectively less than and greater than the band pass filter centerpoint, it is the case that the dither harmonic spectra does not pass through the frequency peak or centerpoint of the bandpass filter. Consequently, the resulting output of the PIN diode is an electric sinusoidal signal of the same frequency as the dither frequency such as depicted in corresponding FIGS. 5(a) and 5(c). It is noted that for the laser signals at frequencies below the peak (FIG. 3(a)) the feedback error signal 32 corresponds in frequency and phase to the dither signal (FIG. 5(a)), however for the laser signals at frequencies above the peak (FIG. 3(c)) the feedback error signal 32 corresponds in frequency but is 180° opposite phase of the dither signal (FIG. 5(c)). Due to the bipolar nature of the feedback signal (error signal) for cases when the laser signal centerpoint is misaligned with the bandpass filter centerpoint, it is thus known in what direction to drive the laser diode (magnitude and direction), which phenomena may be exploited in many different applications. For the laser signal depicted in FIG. 3(b) having the laser frequency center point aligned with the bandpass function centerpoint, the dither harmonic spectra is aligned with and passes through the frequency peak (maximum) of the bandpass filter twice. That is, during one cycle (a complete round trip of the sinusoid dither signal), the dither signal passes though the centerpoint twice. This results in a frequency doubling of the dither frequency of the feedback signal 32, i.e., a unique frequency doubling signature, as depicted as PIN diode output 32' in FIG. 5(b) showing an feedback error signal at twice the frequency of the dither frequency.

Thus, in each instance, as depicted in corresponding FIG. 5(b), the resulting feedback signal exhibits frequency doubling if the laser center wavelength is aligned with the filter center wavelength; otherwise it generates a signal with the same dither frequency, which is either in phase (FIG. 5(a)) or out of phase (FIG. 5(c)) with the original dither modulation. It should be understood that, for the case where there the laser center frequency is misaligned with the bandpass filter peak and yet there is exhibited partial overlap of the dither spectra through the bandpass filter peak (i.e., the centerpoint peak is traversed twice in a dither cycle), the PIN diode will detect partial frequency doubling laser at opposite phases depending upon whether the laser center frequency is inboard or outboard of the filter center frequency. Thus, even though partial frequency doubling is detected, it may still be detected from the feedback signal in which direction and magnitude the laser signal should be driven for alignment.

Referring now to FIGS. 6(a) and 6(c), for the case when the laser and filter are not aligned, the cross product signal 42 resulting from the mixing of the amplified feedback error with the original dither sinusoid is a signed error signal either at a first polarity (for the laser signals at frequencies below the bandpass filter centerpoint), such as shown in FIG. 6(a) or, at a second polarity (for the laser signals at frequencies above the bandpass filter centerpoint), such as shown in FIG. 6(c). Each of these signals may be rectified and converted into a digital output laser bias voltage signal 48 as shown in respective FIGS. 7(a) and 7(c), which are fed back to respectively increase or decrease the laser current (wavelength) in such a way that the laser center wavelength moves closer to the bandpass filter centerpoint. For the case when the laser and filter are aligned, the cross product generated is the frequency doubled signal (twice the frequency of the dither) as shown in the figures. Consequently, this results in a 0 V dc bias voltage (FIG. 7(b)) which will maintain the laser frequency centerpoint at its current wavelength value.

Figure 8:
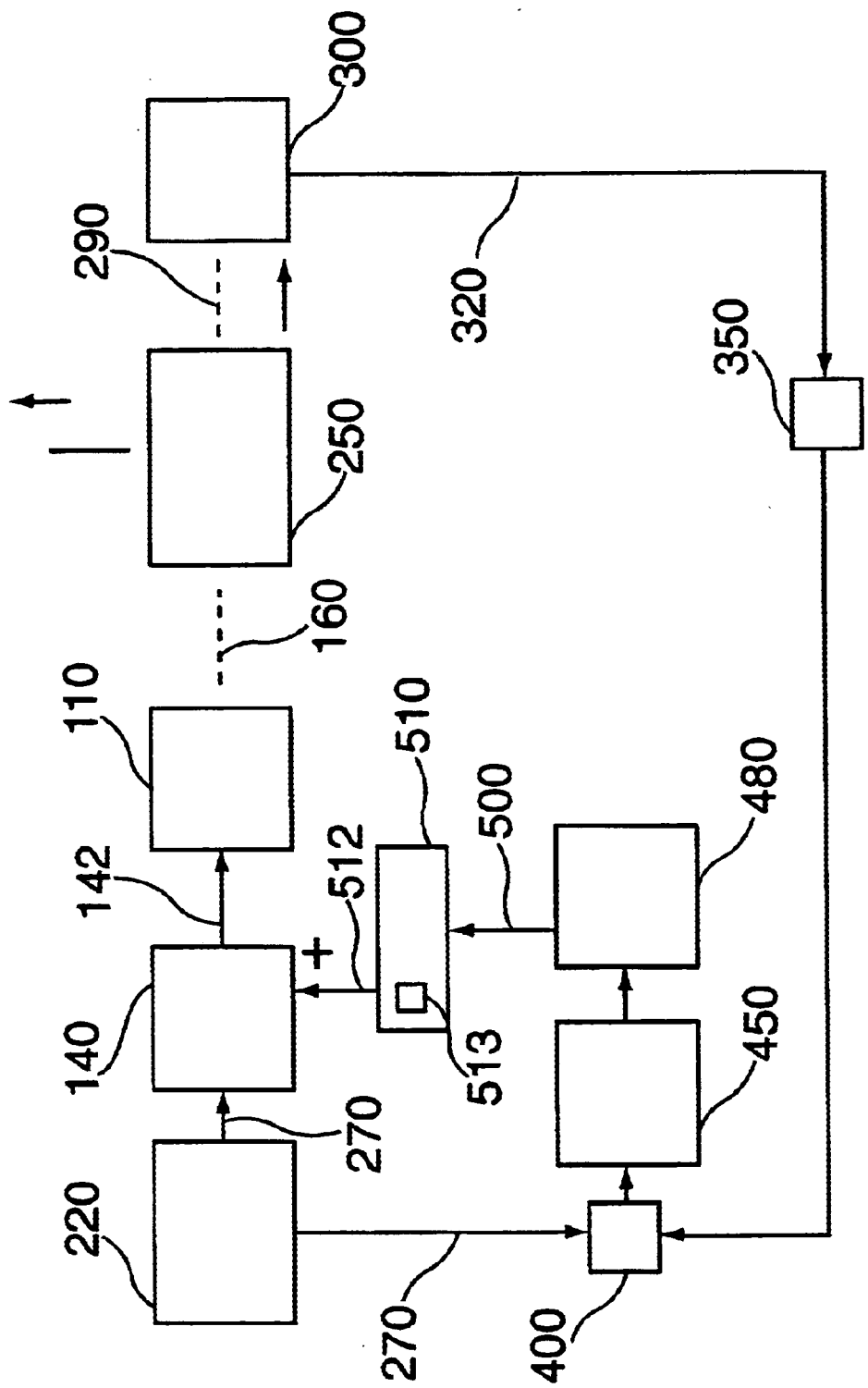
FIG. 8 is an exemplary schematic diagram of the system for reducing the PMD effects in a fiber optical data transmission system according to a first embodiment of the invention.
Figure 9:
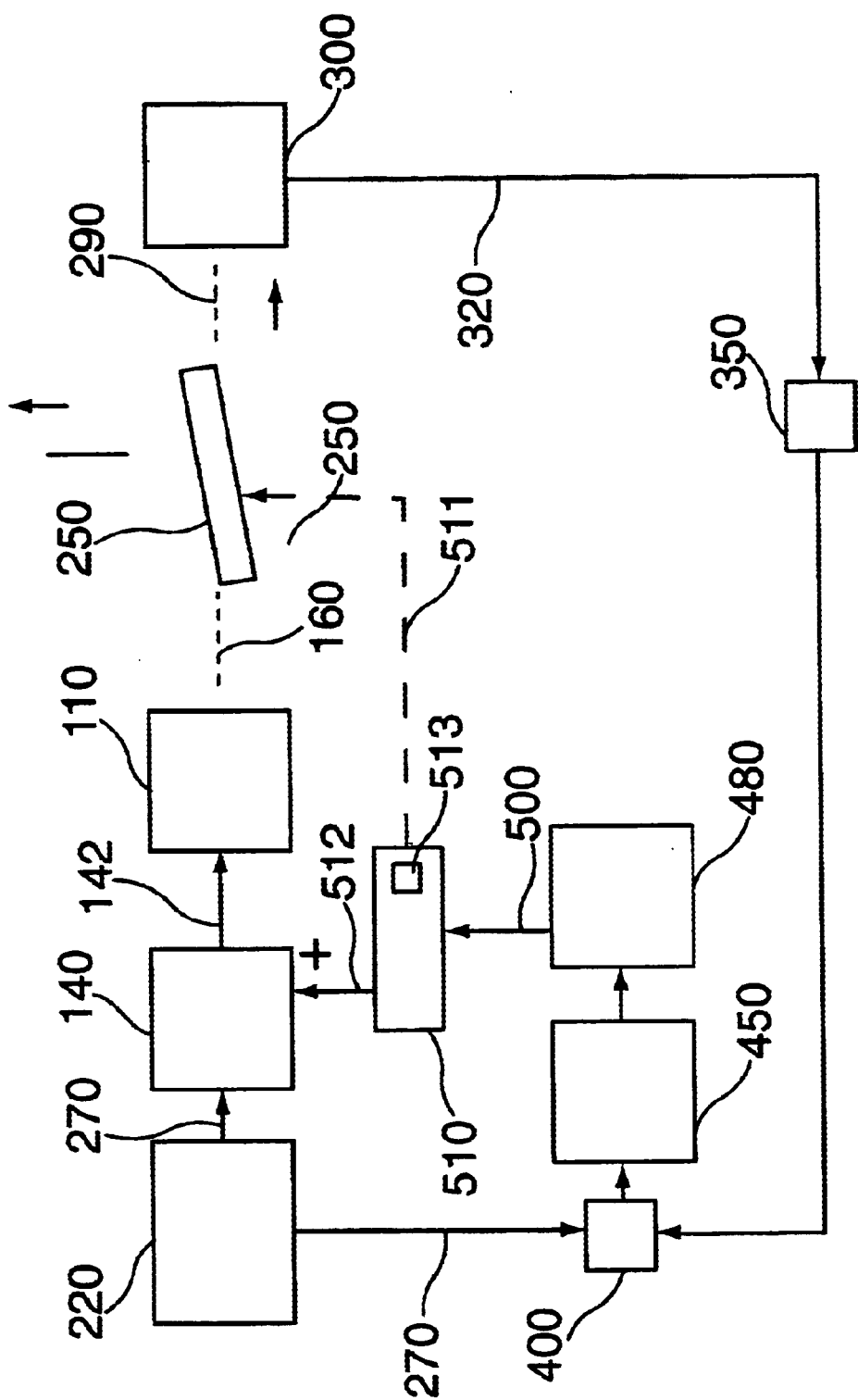
FIG. 9 is an exemplary schematic diagram of the system for reducing the PMD effects in a fiber optical data transmission system according to a second embodiment of the invention.

The system for reducing the PMD effects in a fiber optical data transmission system according to the present invention is now described with respect to FIG. 8 which teaches the system for providing PMD compensation by wavelength control, i.e., control of the input signal wavelength characteristics; and with respect to FIG. 9 which teaches the system for providing PMD compensation utilizing strain control, i.e., by manipulation of the optical fiber itself.

As shown in FIG. 8, according to a first embodiment, there is provided an optical fiber transmission system 100 including a length of optical fiber 250, e.g., 50–100 km single mode fiber such as used in long distance transmission; and, an optical signal generator such as a laser diode 110 for providing laser light 160 through the optical fiber in response to application of a bias voltage 142 provided by a bias voltage generator device 140. According to the invention, a small percentage of the transmitted light 290 is tapped from the optical fiber 250 for input to a commercially available PMD detection device 300 for detecting the level of PMD. Preferably, the light output 290 from the fiber length 250 passes through a beamsplitter (not shown), which samples a small portion of the light for the PMD detector 300. The amount of light 290 that may be split of may range anywhere between one percent (1%) to five percent (5%) of the optical output signal 160, however, skilled artisans will appreciate an amount of light 290 above the noise level that retains the integrity of the output signal including a dither modulation characteristic, as will be explained, may be tapped off. Furthermore, this tapped signal 290 is representative of the PMD signal distortion that results due to imperfections in the length of optic fiber cable 250.

As shown in FIG. 8, the PMD detection device 300, in response, generates an electric signal 320 that is proportional to the amount of PMD detected. In the manner as will be described, the WLL servo-control feedback loop is implemented to adjust the bias voltage 142 in a manner to control the source wavelength in such a way as to minimize the resulting PMD. A number of commercial instruments have been developed which may be used by field technicians to measure differential group delay and characteristic PMD, and several laboratory techniques exist which may yield more accurate data. For example, as would be known to skilled artisans, commercially available PMD detectors 300 employing interferometric, fixed analyzer or, a Jones Matrix techniques may be implemented and used as part of the invention for monitoring and detecting the level of PMD. It should be understood that the basic embodiment may either be implemented at both ends of a working communication link (if the distance is not too great), or it may be used as part of the link transmitter with a shorter piece of representative fiber from the link. It is noted that since PMD is statistical in nature it may be modeled as a Gaussian function for purposes of explanation.

As further shown in FIG. 8, there is provided an external oscillator 220 which generates a low frequency dither modulation signal 270 (e.g., a sinusoidal signal in the kHz frequency range or less, however adjustable as needed, in order to avoid interference with other operating frequencies in the system). As described in greater detail herein, the low frequency dither modulation signal 270 is imposed on the bias voltage generator device 140 for the laser diode to modulate the bias current of a laser diode, and hence the laser diode's output wavelength. The laser diode's wavelength is controlled by the bias current in this embodiment, although other applications are possible such as controlling the laser temperature, for example. The laser voltage bias is thus modulated by a dithering current from the signal generator. Variations in the laser bias produce a corresponding dither in the center wavelength of the laser output. This laser output passes through the section of optical fiber (either a short piece representative of the real link, or the entire link if the distance is not too great). As the PMD is wavelength dependent, then the initial, arbitrarily chosen center operating wavelength of the laser signal will induce some level of PMD in the fiber. The light emerging from the fiber is monitored by the PMD detector 300 which generates the electrical signal 320 proportional to the amount of PMD measured. The electrical signal 320 is amplified by amplifier device 350, and, is fed back to a mixer device 400, where it is multiplied with the low frequency modulation signal 270 from the same external oscillator 220 used to modulate the bias current of a laser diode at the low modulation frequency. This results in the cross product of the two signals as described herein. Implementing low pass filter 450, the resulting signal is low pass filtered to remove higher order terms, and then integrated and optionally digitized by device 480 to result in an error signal 500 which may be used to determine the laser center wavelength with respect to the fiber's passband. This signal 500 provides the means of controlling both the amount and direction in which the laser center wavelength may be adjusted to minimize the effects of PMD in the fiber link, independent of all other chromatic and modal effects in the fiber. Preferably, the error signal 500 is fed back through a digital control logic circuit 510 which generates the appropriate laser diode drive voltage 512 for the bias signal generator device 140. For instance, the control logic circuit 510 may include a look-up table 513 for mapping error signal values against input bias currents for adjusting the center wavelength of the optical signal in the appropriate direction for reducing the PMD effects. In this manner, this invention is used to vary the laser wavelength until the PMD is minimized.

It should be understood that the present invention generalizes to a multi-level analog signal as well as a digital signal. That is, if the feedback loop logic is analog rather than digital, then it may be used to sample the value of the signals at any instant and compare it with a set of desired multi-level discrete signal levels. The analog signal is then quantized or digitized to the appropriate value, and the feedback signal is used to adjust the laser to produce an optimized optical output corresponding to the sampled analog signal. These different cases can be realized by using the proper driver logic and lookup tables in the control logic circuit 510 implemented.

With respect to a second embodiment of the invention as depicted in FIG. 9, there is illustrated the system 100 of FIG. 8 modified for providing PMD compensation utilizing X-Y strain control, i.e., by manipulation of the optical fiber element 250 itself. Thus, in a second embodiment of the invention, in accordance with the error signal 500 generated in the WLL, a control signal 511 may generated by control logic circuit 510 for use in varying properties of the fiber, for example, bending a fiber stub to preferentially induce strain along either the horizontal (X) or vertical (Y) polarization direction of the fiber. For instance, as shown in FIG. 9, the control logic circuit 510 may include a look-up table 513 for mapping error signal values against strain adjustment values for physically adjusting the optical fiber link in the appropriate direction for reducing the PMD effects, i.e., map the X,Y mechanical strain required for correcting the fiber birefringence as measured by the amount of PMD detected. In this manner, compensation for polarization specific attenuation effects may be achieved. It is also possible to implement feedback control on other properties of the optical signal that are known to influence PMD. For example, feedback control may be used to maximize subharmonics in the transmitted signal, or eliminate holes in the signal frequency spectrum that arise from the mixing of polarization-delayed signals. By using the WLL, the laser wavelength may be scanned over a desired range with high accuracy; if a broadband optical receiver is substituted for the PMD detector, then a search may be performed to locate and compensate for holes in the frequency spectra after light has passed through the fiber.

Alternately, a digital logic circuit may be used in conjunction with the broadband detector to compute higher order derivatives of the output signal, which may be used to optimize for subharmonics. This has the advantage of converging to an optimal solution more rapidly than first-order methods. By overcoming PMD limits in this way, it is possible to transmit very high data rates over long distances without requiring special types of optical fiber. The invention further renders it possible to reuse of installed legacy fiber for higher data rate transmission.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A dispersion compensation system for an optical system comprising:

an optical signal generator for providing an optical signal capable of being transmitted via a fiber optic link in an optical network, said optical signal characterized as having an operating center wavelength and said fiber optic length exhibiting means for causing polarization mode dispersion of said optical signal;

a detector device for detecting an amount of polarization mode dispersion characteristic of said optical signal transmitted in said fiber link and generating an electric signal representing said detected amount;

wavelength-locked loop servo-control circuit for automatically adjusting a peaked center wavelength of said optical signal in accordance with said detected amount of polarization mode dispersion to thereby minimize said polarization mode dispersion of said optical signal in said optical fiber link, said adjusted optical signal capable of being optimally transmitted over longer fiber distances with reduced dispersion effects in said optical network.

2. The dispersion compensation system for an optical system as claimed in claim 1, wherein said wavelength-locked loop servo-control circuit comprises:

a mechanism for applying a dither modulation signal at a dither modulation frequency to said optical signal to generate a dither modulated optical signal for transport through said length of optical fiber;

a mechanism for converting a portion of dither modulated optical signal into an electric feedback signal;

a mechanism for continuously comparing said feedback signal with said dither modulation signal and generating a respective error signal, said error signal representing one of a difference between a frequency characteristic of said feedback signal and a dither modulation frequency; and, a mechanism responsive to said error signal for adjusting the peak spectrum function of said optical signal according to said error signal, wherein said center wavelength of said optical signal becomes adjusted in a direction for reducing polarization mode dispersion of said optical signal in said optical fiber link.

3. The dispersion compensation system for an optical system as claimed in claim 2, wherein said length of optical fiber exhibits peaked passband filter characteristic having a center wavelength, said center wavelength of said adjusted optical signal becoming aligned with said peaked passband filter characteristic when said frequency characteristic of said feedback signal is two times said dither modulation frequency.

4. The dispersion compensation system for an optical system as claimed in claim 2, wherein said optical signal is a laser signal, said optical signal generator comprising:

a laser diode device for generating said optical signal; and, a bias voltage circuit for providing said input bias signal to said laser diode device for generating said optical signal.

5. The dispersion compensation system for an optical system as claimed in claim 4, wherein said device for applying a dither modulation to said bias signal is a sinusoidal dither circuit for generating a sinusoidal dither modulation signal of a predetermined frequency.

6. The dispersion compensation system for an optical system as claimed in claim 4, wherein said mechanism for automatically adjusting a peaked spectrum function of said optical signal includes a control device for receiving said error signal and dynamically adjusting said input bias signal according to an error signal value.

7. The dispersion compensation system for an optical system as claimed in claim 6, wherein said control device includes look-up table for mapping error signal values against input bias currents capable of adjusting said center wavelength of said optical signal in a direction appropriate for reducing the PMD effects.

8. The dispersion compensation system for an optical system as claimed in claim 6, wherein said device for comparing includes a mixer device capable of combining said converted feedback signal with said dither modulation signal and generating a cross-product signal having components representing a sum and difference at dither frequencies.

9. The dispersion compensation system for an optical system as claimed in claim 8, further including:

low-pass filter device for filtering said cross-product signal; and integrator circuit for averaging said output cross-product signal to generate said error signal, whereby said error signal is positive or negative depending on whether a center wavelength of said optical signal is to be respectively decreased or increased for reducing PMD effects in said optical fiber link.

10. The dispersion compensation system for an optical system as claimed in claim 6, further including digitizer device for digitizing said error signal prior to input to said control device.

11. A dispersion compensation system for an optical system comprising:

an optical signal generator for providing an optical signal capable of being transmitted via a fiber optic link in an optical network, said optical signal characterized as having an operating center wavelength and said fiber optic length exhibiting means for causing polarization mode dispersion of said optical signal;

a detector device for detecting an amount of polarization mode dispersion characteristic of said optical signal transmitted in said fiber link and generating an electric signal representing said detected amount;

wavelength-locked loop servo-control circuit for physically adjusting said optical fiber in accordance with a detected amount of polarization mode dispersion detected to thereby minimize said polarization mode dispersion of said optical signal in said optical fiber link, said adjusted optical signal capable of being optimally transmitted over longer fiber distances with reduced dispersion effects in said optical network.

12. The dispersion compensation system for an optical system as claimed in claim 11, wherein said wavelength-locked loop servo-control circuit comprises:

a mechanism for applying a dither modulation signal at a dither modulation frequency to said optical signal to generate a dither modulated optical signal for transport through said length of optical fiber;

a mechanism for converting a portion of dither modulated optical signal into an electric feedback signal;

a mechanism for continuously comparing said feedback signal with said dither modulation signal and generating a respective error signal, said error signal representing one of a difference between a frequency characteristic of said feedback signal and a dither modulation frequency; and, a mechanism responsive to said error signal for strain adjusting said optic fiber link in one or more of a horizontal dimension or a vertical dimension according to said error signal, said fiber link being strain adjusted in a dimension for reducing polarization mode dispersion of said optical signal in said optical fiber link.

13. The dispersion compensation system for an optical system as claimed in claim 12, wherein said optical signal is a laser signal, said optical signal generator comprising:

a laser diode device for generating said optical signal; and, a bias voltage circuit for providing said input bias signal to said laser diode device for generating said optical signal.

14. The dispersion compensation system for an optical system as claimed in claim 13, wherein said device for applying a dither modulation to said bias signal is a sinusoidal dither circuit for generating a sinusoidal dither modulation signal of a predetermined frequency.

15. The dispersion compensation system for an optical system as claimed in claim 13, further including a control device for receiving said error signal and enabling dynamic strain adjustment of said optic fiber link in an appropriate dimension according to an error signal value.

16. The dispersion compensation system for an optical system as claimed in claim 15, wherein said control device includes look-up table for mapping error signal values against strain adjustment values for physically adjusting the optical fiber link in the appropriate direction for reducing the PMD effects.

17. The dispersion compensation system for an optical system as claimed in claim 15, wherein said device for comparing includes a mixer device capable of combining said converted feedback signal with said dither modulation signal and generating a cross-product signal having components representing a sum and difference at dither frequencies.

18. The dispersion compensation system for an optical system as claimed in claim 17, further including:
   low-pass filter device for filtering said cross-product signal; and
   integrator circuit for averaging said output cross-product signal to generate said error signal, whereby said error signal is positive or negative depending on whether a strain adjustment of said optical fiber is to be respectively decreased or increased for reducing PMD effects in said optical fiber link.

19. The dispersion compensation system for an optical system as claimed in claim 15, further including digitizer device for digitizing said error signal prior to input to said control device.

20. A method of compensating for optical polarization dispersion effects in a length of optical fiber in an optical network, said method comprising the steps of:
   a) receiving an input optical signal in said optical network, said optical signal characterized as having an operating center wavelength and said fiber optic length exhibiting means for causing polarization mode dispersion of said optical signal;
   b) detecting an amount of polarization mode dispersion characteristic of said optical signal transmitted in said fiber link and generating an electric signal representing said detected amount;
   c) automatically adjusting in real-time a peaked center wavelength of said optical signal in accordance with said detected amount of polarization mode dispersion to thereby minimize said polarization mode dispersion of said optical signal in said optical fiber link, said adjusted optical signal capable of being optimally transmitted over longer fiber distances with reduced dispersion effects in said optical network.

21. The method as claimed in claim 20, wherein said step c) of providing real-time adjustment comprises the steps of:
   applying a dither modulation signal at a dither modulation frequency to said optical signal to generate a dither modulated optical signal for transport through said length of optical fiber;
   converting a portion of dither modulated optical signal into an electric feedback signal;
   continuously comparing said feedback signal with said dither modulation signal and generating a respective error signal, said error signal representing one of a difference between a frequency characteristic of said feedback signal and a dither modulation frequency; and,
   adjusting the peak spectrum function of said optical signal according to said error signal, wherein said center wavelength of said optical signal becomes adjusted in a direction for reducing polarization mode dispersion of said optical signal in said optical fiber link.

22. The method as claimed in claim 21, wherein said optical signal is a laser signal, said method comprising:
   providing a laser diode device for generating said optical signal; and,
   providing an input bias signal to said laser diode device for generating said optical signal.

23. The method as claimed in claim 22, wherein said sinusoidal dither modulation signal is of a predetermined frequency.

24. The method as claimed in claim 22, wherein said step c) of automatically adjusting a peaked spectrum function of said optical signal includes dynamically mapping error signal values against input bias currents capable of adjusting said center wavelength of said optical signal in a direction appropriate for reducing the PMD effects.

25. The method as claimed in claim 22, wherein said continuously comparing step includes the steps of:
   combining said converted feedback signal with said dither modulation signal and generating a cross-product signal having components representing a sum and difference at dither frequencies;
   filtering said output cross-product signal; and
   averaging said output cross-product signal to generate said error signal, whereby said error signal is positive or negative depending on whether a center wavelength of said optical signal is to be respectively decreased or increased for reducing PMD effects in said optical fiber link.

26. A method of compensating for optical polarization dispersion effects in a length of optical fiber in an optical network, said method comprising the steps of:
   a) receiving an input optical signal in said optical network, said optical signal characterized as having an operating center wavelength and said fiber optic length exhibiting means for causing polarization mode dispersion of said optical signal;
   b) detecting an amount of polarization mode dispersion characteristic of said optical signal transmitted in said fiber link and generating an electric signal representing said detected amount;
   c) physically adjusting said optical fiber in accordance with a detected amount of polarization mode dispersion detected to thereby minimize said polarization mode dispersion of said optical signal in said optical fiber link, said adjusted optical signal capable of being optimally transmitted over longer fiber distances with reduced dispersion effects in said optical network.

27. The method as claimed in claim 26, wherein said step c) of providing real-time adjustment comprises the steps of:
   applying a dither modulation signal at a dither modulation frequency to said optical signal to generate a dither modulated optical signal for transport through said length of optical fiber;
   converting a portion of dither modulated optical signal into an electric feedback signal;
   continuously comparing said feedback signal with said dither modulation signal and generating a respective error signal, said error signal representing one of a difference between a frequency characteristic of said feedback signal and a dither modulation frequency; and,
   strain adjusting said optic fiber link in one or more of a horizontal dimension or a vertical dimension according to said error signal, said fiber link being strain adjusted in a dimension for reducing polarization mode dispersion of said optical signal in said optical fiber link.

28. The method as claimed in claim 26, wherein said optical signal is a laser signal, said method comprising:
   providing a laser diode device for generating said optical signal; and,
   providing an input bias signal to said laser diode device for generating said optical signal.

29. The method as claimed in claim 27, wherein said sinusoidal dither modulation signal is of a predetermined frequency.

30. The method as claimed in claim 27, wherein said strain adjusting step includes dynamically mapping error signal values against strain adjustment values for physically adjusting the optical fiber link in the appropriate direction for reducing the PMD effects.

* * * * *